United States Patent
Jegaden et al.

(10) Patent No.: US 10,109,858 B1
(45) Date of Patent: Oct. 23, 2018

(54) METHOD FOR PREPARING ELECTROLYTIC MANGANESE DIOXIDE

(71) Applicant: Tronox LLC, Oklahoma City, OK (US)

(72) Inventors: Laurie I. Jegaden, Edmond, OK (US); Phllip M. Story, Yukon, OK (US)

(73) Assignee: Tronox LLC, Oklahoma City, OK (US)

( * ) Notice: Subject to any disclaimer, the term of this patent is extended or adjusted under 35 U.S.C. 154(b) by 124 days.

(21) Appl. No.: 15/150,027

(22) Filed: May 9, 2016

Related U.S. Application Data

(60) Provisional application No. 62/158,701, filed on May 8, 2015.

(51) Int. Cl.
| | |
|---|---|
| *H01M 4/50* | (2010.01) |
| *H01M 4/505* | (2010.01) |
| *C25B 1/21* | (2006.01) |
| *C01G 45/12* | (2006.01) |
| *H01M 4/02* | (2006.01) |

(52) U.S. Cl.
CPC ........ *H01M 4/505* (2013.01); *C01G 45/1221* (2013.01); *C25B 1/21* (2013.01); *C01P 2006/40* (2013.01); *H01M 2004/028* (2013.01)

(58) Field of Classification Search
CPC .................................................... H01M 4/505
See application file for complete search history.

(56) References Cited

U.S. PATENT DOCUMENTS

| | | | |
|---|---|---|---|
| 6,248,477 B1 | 6/2001 | Howard, Jr. et al. | |
| 6,322,744 B1 * | 11/2001 | Kelley | H01M 4/366 264/446 |
| 6,558,844 B2 | 5/2003 | Howard, Jr. et al. | |
| 2008/0032196 A1 * | 2/2008 | Park | H01M 4/505 429/223 |
| 2010/0327221 A1 * | 12/2010 | Koga | C01G 45/02 252/182.1 |
| 2013/0187083 A1 * | 7/2013 | Iwata | C01G 45/02 252/182.1 |
| 2013/0224585 A1 * | 8/2013 | Oh | H01M 4/505 429/211 |
| 2014/0106223 A1 * | 4/2014 | Xu | H01M 4/366 429/220 |
| 2015/0188121 A1 * | 7/2015 | Lee | H01M 4/131 429/224 |
| 2015/0270545 A1 * | 9/2015 | Axelbaum | H01M 4/525 429/223 |
| 2015/0287984 A1 * | 10/2015 | Kong | H01M 4/1315 429/223 |
| 2015/0311516 A1 * | 10/2015 | Chen | H01M 4/134 429/220 |
| 2015/0372293 A1 * | 12/2015 | Story | H01M 4/366 429/220 |
| 2016/0181609 A1 * | 6/2016 | Shin | H01M 4/505 429/224 |
| 2016/0218399 A1 * | 7/2016 | Mizuta | H01M 10/052 |
| 2017/0256789 A1 * | 9/2017 | Kao | H01M 4/364 |
| 2017/0263931 A1 * | 9/2017 | Wu | H01M 4/505 |
| 2017/0279118 A1 * | 9/2017 | Takami | H01M 4/485 |
| 2017/0301909 A1 * | 10/2017 | Lee | H01M 4/131 |
| 2017/0309908 A1 * | 10/2017 | Mitsumoto | H01M 4/505 |
| 2017/0317346 A1 * | 11/2017 | Ikenuma | H01M 4/131 |

FOREIGN PATENT DOCUMENTS

WO    WO-2012163300 A1 * 12/2012 ............ H01M 4/134

* cited by examiner

*Primary Examiner* — Liam J Heincer
(74) *Attorney, Agent, or Firm* — McAfee & Taft

(57) ABSTRACT

Disclosed herein is an improved cathode material prepared from high purity electrolytic manganese dioxide. Also disclosed is a method for preparing high purity $MnO_2$ and converting $MnO_2$ particles to $Mn_2O_3$.

9 Claims, No Drawings

US 10,109,858 B1

METHOD FOR PREPARING ELECTROLYTIC MANGANESE DIOXIDE

PRIORITY CLAIM

This application claims the benefit of U.S. Provisional Application Ser. No. 62/158,701, filed on May 8, 2015.

SUMMARY

Disclosed herein are methods for preparing electrolytic manganese dioxide and electrolytic manganese dioxide having lower concentrations of impurities.

In one embodiment, the present disclosure describes a method which includes the step of adding an acid solution containing dissolved manganese metal, i.e. $Mn^{++}$ ions, to an electrolytic cell. Subsequently, $MnO_2$ is isolated as a solid by applying a current through the cell. Following harvesting of the $MnO_2$, the product undergoes particle size reduction, neutralization, followed by filtering and drying. Subsequently the isolated $MnO_2$ is converted to $Mn_2O_3$.

In another embodiment, the present disclosure describes a method for preparing $Mn_2O_3$. The method comprises the steps of:
preparing a solution comprising a mineral acid and metallic manganese;
passing the resulting solution to an electrolytic cell;
passing an electric current through the electrolytic cell, thereby plating $MnO_2$ out on the anodes of the electrolytic cells;
collecting the $MnO_2$;
neutralizing the $MnO_2$ using a basic solution;
filtering and drying the neutralized $MnO_2$; and,
heating the $MnO_2$ for a period of time and at a temperature sufficient to convert the $MnO_2$ to $Mn_2O_3$.

In another embodiment, the present disclosure describes a high purity electrolytic manganese dioxide (EMD), i.e. $MnO_2$, with very low amounts of contaminants. The high purity EMD is a composition comprising $MnO_2$ and less than 175 ppm of trace metals. Specifically, the high purity EMD has less than 10 ppm Al, less than 50 ppm Ca, less than 50 ppm K, less than 15 ppm Mg and less than 50 ppm Na.

In another embodiment, the present disclosure relates to a secondary battery. The secondary battery comprises a cathode material comprising lithium manganese oxide prepared from a lithium compound and $Mn_2O_3$ particles. The secondary battery has an initial capacity of at least 111.0 mAhr/g of cathode active material and the secondary battery is capable of at least 2500 charge/discharge cycles before the capacity of said battery drops below 80% of the initial capacity. The lithium magnesium oxide component of the cathode material is represented by $Li_{1+x}Mn_{2-x-y}M_yO_4$ where x is generally less than 0.25, and y is less than about 0.5 and M is a trivalent transition metal or Al.

DETAILED DESCRIPTION

The present method provides for the conversion of metal manganese to $MnO_2$. Subsequently, the method provides for conversion of very pure $MnO_2$ (EMD) to $Mn_2O_3$.

In one embodiment, the method provides for the preparation of a solution of $Mn^{++}$ ions by dissolving manganese metal, typically in the form of powder or chips, in a mineral acid. Typically, the method will utilize sulfuric acid; however, nitric acid and other mineral acids capable of dissolving at least 47 g/l of $Mn^{++}$ will perform satisfactorily. The final concentration of $Mn^{++}$ in solution will be between about 20 g/L to about 254 g/L. Typically, the solution will contain about 47 g/L of $Mn^{++}$. The final pH of the solution containing $Mn^{++}$ may range between about two and about eight; however, a typical operational pH will be between about 5.5 and about 7.0.

Mineral acid solution containing $Mn^{++}$ flows to a series of electrolytic cells. An electric current passes through the electrolytic cells at a current density between about 2.5 $Amp/ft^2$ and 6 $Amp/ft^2$. During the application of current, $MnO_2$ plates out on the anodes of the electrolytic cells. The plating process generally operates at temperatures of about 93° C. to about 99° C. as the acid solution flows through the cells. Acid solution exiting the cells has been substantially depleted of $Mn^{++}$ ions. The depleted acid is used to dissolve additional manganese metal and is returned to the cells. Typically, the plating process continues for about three to about 40 days when operating at the indicated current densities.

After the electrolytic cells have been taken offline, i.e. upon completion of the plating process, $MnO_2$ is collected from the anodes, ground or crushed to a size suitable for neutralization, neutralized by treatment with a base, filtered, dried and undergoes an additional particle reduction step.

The grinding or crushing of the collected $MnO_2$ may be carried out using any conventional method including but not limited to a plate crusher or plate grinder. The grinding process increases particle surface area thereby improving the subsequent neutralization step. The resulting $MnO_2$ will generally have a particle size of 2 mm or less.

Base solutions used for the neutralization step will have a pH between about 8 and about 12 and must not introduce contaminants to the solid $MnO_2$. Typically, the neutralization step will use lithium hydroxide, lithium carbonate, lithium bicarbonate, ammonium hydroxide or mixtures thereof. Bases such as sodium hydroxide, calcium hydroxide and potassium hydroxide are not preferred, as they will likely contaminate the resulting $MnO_2$ with undesirable calcium, sodium and potassium. Ammonium hydroxide will be particularly advantageous during the neutralization step as it may be removed during heating of the resulting $MnO_2$ particles. The neutralization step yields an EMD having very high purity, i.e. trace elements such as Ca, Al, K, Mg and Na are extremely low in concentration or not found in the resulting EMD.

The neutralization step may take place at a temperatures ranging from room temperature to about the boiling point of the slurry or solution for a period of about 20 minutes to about 120 minutes. In general, the neutralization step is considered complete when the effluent from the particles or the slurry of particles has a pH above 5.5. In this method, neutralization is a diffusion-limited process. As a result, the neutralization solution must contain excess base to drive the diffusion. To enhance distribution of the base solution and promote washing of anions from the surfaces of the product, the preferred pH of the neutralization solution will be in the range of about 8 to about 10. Excess liquid produced during the neutralization step is discarded along with the resulting salts.

Following neutralization, drying and collection, the resulting $MnO_2$ particles undergo size reduction and classification. Typically, the size reduction step will utilize a jet mill; however, other devices will also provide satisfactory particles. The desired resulting particles generally have particle sizes ranging from about 100 nm up to about 300 micrometers. A typical batch of $MnO_2$ particles may have a median particle size of about 10 micrometers. However, batches of $MnO_2$ suitable for conversion to $Mn_2O_3$ may have a median particle size as low as 3 micrometers and other batches may have a median particle size as large as 35 micrometers.

The final EMD produced by the above-described method is of very high purity. For example, EMD produced at a current density of 5.6 Amp/ft$^2$, at a temperature of 96° C. using a sulfuric acid solution containing 47.3 g of Mn$^{++}$ per liter was compared to conventional EMD. The impurity values of the high purity EMD versus the conventional EMD are provided in the following table.

| Impurity | Conventional EMD | High Purity EMD |
| --- | --- | --- |
| Aluminum (Al) | >100 | <10 |
| Calcium (Ca) | >150 | <50 |
| Potassium (K) | >200 | <50 |
| Magnesium (Mg) | >50 | <15 |
| Sodium (Na) | >75 | <50 |

Following isolation of the desired MnO$_2$ particles, the method converts the MnO$_2$ particles, i.e. high purity EMD, to Mn$_2$O$_3$ by heating at a temperature between about 700° C. and about 850° C. for a period between about 1 and about 24 hours under an atmosphere of air. Generally, the heating occurs between about 725° C. and about 775° C. for a period between about 2 and about 12 hours. Preferably, heating takes place at about 700° C. for about 12 hours. The resulting Mn$_2$O$_3$ particles have surface areas between about 0.5 m$^2$/gram and about 5 m$^2$/gram.

As demonstrated by the following examples, the resulting Mn$_2$O$_3$ particles are suitable for use in manufacturing a lithium manganese oxide (LiMn$_2$O$_4$) cathode material. The Mn$_2$O$_3$ particles are combined with Li$_2$CO$_3$, LiOH, Li$_2$O, HLiCO$_3$ and optionally additional metal oxides as a doping material. Typically, the final lithium manganese oxide will include a doping metal such as chromium (Cr) and aluminum (Al) in the form of one of their oxides. The final formulation of the cathode material will generally be Li$_{1+x}$Mn$_{2-x-y}$M$_y$O$_4$ where x is generally less than 0.25, and y is less than about 0.5 and M is a trivalent transition metal or Al. The final formulation may also contain up to about 15% by weight of a dopant. Typically, the final formulation will contain from about 1% to about 6% by weight of a dopant.

In this example, 4175 grams of Mn$_2$O$_3$ particles (median particle size of 10 micrometers) prepared according to the method outlined above, were blended with 1125.9 grams of Li$_2$CO$_3$ and 222.9 grams of Cr$_2$O$_3$, as a dopant, to provide a homogeneous mixture. Five hundred grams of the resulting mixture were heated to 850° C. in air for five hours and subsequently cooled at 2° C./minute to room temperature. Following cooling the product was broken up and re-mixed. Heating and cooling cycles occurred three times. The product was then ground and screened to remove any particles larger than 45 micrometers. Coin cells prepared from the final product, Li$_{1.06}$Cr$_{0.1}$Mn$_{1.84}$O$_4$, were tested against a conventional lithium metal anode. The coin cells were repeatedly cycled at 60° C., at a rate of one full discharge to a level of 3.0V completed in 50-60 minutes, followed by a 3 hour charge to a level of 4.3V. The cells using a cathode prepared from the lithium manganese oxide cathode material had an average fade rate of <0.010%/cycle and an initial capacity of at least 111.0 mAhr/g. Using an "end of life" for the battery defined as a capacity retention of 80% of the initial capacity of the cell, batteries prepared from the described material should be capable of over 2500 charge/discharge cycles.

To provide a direct comparative example, conventional lithium neutralized alkaline battery grade electrolytic manganese dioxide (EMD) was converted to Mn$_2$O$_3$ and treated according to the steps described in the above example to prepare a cathode material having the formulation of Li$_{1.06}$Cr$_{0.1}$Mn$_{1.84}$O$_4$. Conventional alkaline battery grade EMD is prepared from manganous sulfate and purified according to conventional methods. Coin cells with cathodes prepared from this lithium manganese oxide material had a fade rate of 0.032%/cycle and a maximum discharge capacity of 115.6 mAhr/g. As used herein, the term maximum discharge capacity also refers to the initial capacity of the cell. Batteries prepared from this material would be expected to have a capacity retention of 80% after experiencing about 625 charge/discharge cycles.

Thus, the cells using cathodes prepared from the lithium manganese oxide cathode material using the high purity EMD described above have an improved average fade rate when compared to cells prepared from lithium manganese oxide synthesized with conventional alkaline battery grade EMD. Additionally, the average cell life provided by the lithium manganese oxide cathode material using high purity EMD should be four times greater than lithium manganese oxide synthesized with conventional alkaline battery grade EMD.

Other embodiments of the present invention will be apparent to one skilled in the art. As such, the foregoing description merely enables and describes the general uses and methods of the present invention. Accordingly, the following claims define the true scope of the present invention.

What is claimed is:

1. A non-aqueous secondary battery comprising:
   a lithium manganese cathode material comprising a lithium compound and Mn$_2$O$_3$ particles, said lithium manganese cathode material represented by the formula Li$_{1+x}$Mn$_{2-x-y}$M$_y$O$_4$ where x is generally less than 0.25, and y is less than about 0.5 and M is a trivalent transition metal or Al;
   said secondary battery having an initial capacity of at least 111.0 mAhr/g of cathode active material and said battery capable of at least 2500 charge/discharge cycles before the capacity of said battery drops below 80% of the initial capacity.

2. The non-aqueous secondary battery of claim 1, wherein said cathode material further comprises a dopant.

3. The non-aqueous secondary battery of claim 1, wherein said cathode material further comprises from about 1% by weight to about 6% by weight of a dopant.

4. The non-aqueous secondary battery of claim 1, wherein said cathode material further comprises a dopant selected from the group consisting of chromium oxides and aluminum oxides.

5. The non-aqueous secondary battery of claim 1, wherein said cathode material further comprises up to about 15% by weight of a dopant.

6. The non-aqueous secondary battery of claim 1, wherein said cathode material further comprises from about 1% by weight to about 6% by weight of a dopant selected from the group consisting of chromium oxides and aluminum oxides.

7. The non-aqueous secondary battery of claim 1, wherein said Mn$_2$O$_3$ particles within said lithium manganese oxide have surfaces areas between about 0.5 m$^2$/gram and about 5 m$^2$/gram.

8. The non-aqueous secondary battery of claim 1, wherein said lithium compound is selected from the group consisting of Li$_2$CO$_3$, LiOH, Li$_2$O, CHLiO$_3$.

9. The non-aqueous secondary battery of claim 1, wherein said secondary battery has an initial capacity of at least 111.0 mAhr/g of cathode active material and said battery is capable of at least 2500 charge/discharge cycles when said battery is discharged to a level of 3.0V within 50 to 60 minutes and charged to a level of 4.3 over a period of three hours before the capacity of said battery drops below 80% of the initial capacity.

* * * * *